March 12, 1963   W. H. STOLLE   3,080,863
APPARATUS FOR MELTING THERMOPLASTIC MATERIALS
Filed Aug. 21, 1961
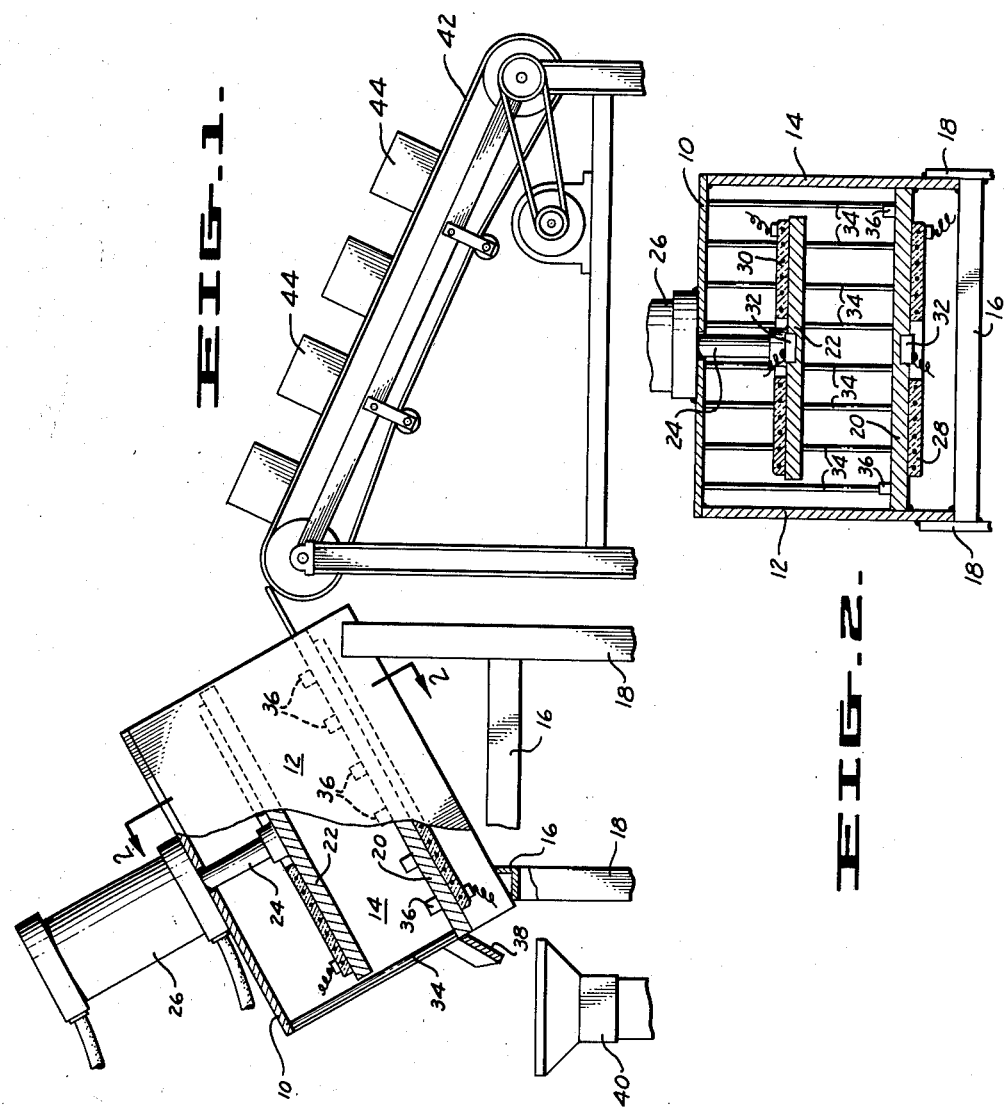
INVENTOR.
WILLIAM H. STOLLE
BY
*Naylor & Neal*
ATTORNEYS 3,080,863
APPARATUS FOR MELTING THERMOPLASTIC
MATERIALS
William H. Stolle, Belmont, Calif., assignor to H. S. Crocker Co., Inc., San Bruno, Calif., a corporation of California
Filed Aug. 21, 1961, Ser. No. 132,966
3 Claims. (Cl. 126—343.5)

This invention relates to apparatus for handling thermoplastic materials and more particularly to apparatus for melting thermoplastic materials.

Large quantities of thermoplastic materials are used in industry in processing operations which require that the materials be fluid. By way of example only thermoplastics such as polyethylene, etc. are used in large quantities as coatings or adhesive films on paper and like stocks where the thermoplastic is applied to the stock as a thin fluid film which solidifies upon cooling. The thermoplastic material is usually acquired in the form of solid pieces of varying size, and the material is then melted for application to the stock.

Conventional apparatus for melting these thermoplastic materials include large vats in which the solid material is melted and stored in bulk. Use of apparatus of this type is very inefficient in a number of situations. The temperature of material in the vats must be regulated very carefully because many of the thermoplastic materials employed are chemically altered when subjected to excessive heat for any prolonged period of time. For this reason, the cold contents of a vat must be heated slowly for long periods of time and with good agitation to first bring the contents to usable temperature, and any subsequent addition of cold material to a partially filled vat lowers excessively the temperature of already warm material.

It is an object of this invention to provide apparatus for melting thermoplastic materials rapidly and on a substantially continuous basis whereby processing operations of the type mentioned can be performed more efficiently.

It is a further object of the invention to provide such apparatus which can melt thermoplastic materials as rapidly as possible without causing chemical change in the materials.

It is another object of this invention to provide such apparatus which may be constructed at minimum cost and operated with maximum ease and flexibility.

Other objects and advantages of the invention will become apparent from the following description read in conjunction with the attached drawing in which:

FIG. 1 is a view in side elevation, partially broken away of apparatus of this invention, and FIG. 2 is a sectional view of the apparatus of FIG. 1 taken along the plane 2—2 of FIG. 1.

The apparatus for melting thermoplastic materials shown in the drawings comprises a support housing having a top wall 10 and side walls 12 and 14 with cross braces 16 welded to side walls 12 and 14 and with vertical posts 18 welded to the braces 16 and side walls 12 and 14. A lower pressure plate 20 is welded between the side walls 12 and 14 with its upper surface inclined to a horizontal plane at an angle of about 30°. This angle of inclination should be greater than 10° to permit gravity flow of liquids off of the plate 20; the angle is preferably less than 80°, and most efficient operation of the device has been obtained when the angle of inclination is between 30° and 50°.

A second pressure plate 22 is mounted on a piston rod 24 of a pneumatic cylinder 26 with the cylinder secured to the top wall 10 of the housing by welding or other suitable means. The pressure plate 22 is mounted parallel to the lower plate 20 and as best seen in FIG. 2 has an area less than the area of the plate 20.

A pair of electrical heating elements 28 and 30 are mounted on the remote sides of the plates 20 and 22 respectively, and thermally actuated switches 32 are mounted on the plates for controlling the supply of current to heating elements 28 and 30.

A plurality of stop rods 34 are attached to the plate 20 adjacent to its lower edge with the rods 34 extending generally perpendicular to the plate 20 and being attached to the top wall 10 of the housing. A second plurality of rods 36 are attached to the side walls 12 of the housing. The rods 36 are shown as being short stub shafts, but they may extend to the wall 10 if desired. All of the rods 34 and 36 lie outside the periphery of the plate 22 thereby permitting the plate 22 to be forced into contact with the plate 20 by the cylinder 26.

A discharge spout 38 is mounted on the lower edge of the plate 20 to deliver liquids flowing from the plate 20, and liquid handling means 40 such as a screw conveyor is mounted below the spout 38 for handling of materials melted by the apparatus. A conveyor 42 is mounted adjacent to the upper end of the plate 20 for conveying blocks 44 of thermoplastic material to the space between the plates 20 and 22. Suitable control elements are provided for reciprocating the plate 22 and starting and stopping the conveyor 42.

In operation of the apparatus, the plates 20 and 22 are maintained at a temperature substantially exceeding the melting point of the thermoplastic material to be melted by the apparatus. The thermoplastic materials with which the apparatus is used are normally very fluid at temperatures between 250° and 300° F. and the plates 20 and 22 are preferably maintained at a temperature of between 400° and 450° F. With the plate 22 raised, the conveyor 42 is operated to deliver a plurality of blocks 44 to the space between the plates 20 and 22, and air pressure is then introduced into the cylinder 26 to force the plate 22 against the blocks. The heat of the plates 20 and 22 melts the thermoplastic material very rapidly, and the liquid flows laterally between the rods 36 and downwardly between the rods 34. The operation of the apparatus permits escape of the liquid from the heated plates sufficiently rapidly that no substantial charring or other thermal reaction in the material can be detected.

While one specific embodiment of the invention has been shown and described in detail herein, it is obvious that many modifications of the structure disclosed may be made without departing from the spirit and scope of the invention.

I claim:

1. Apparatus for melting solid pieces of thermoplastic material which comprises: a pair of pressure plates, heating means connected to one of said plates for heating said one plate to a temperature above the melting point of the thermoplastic material to be melted, support means connected to said plates for mounting said plates generally parallel to each other with said plates inclined to a horizontal plane at an angle exceeding 10°, said support means including reciprocable power means for forcing said plates together, and stop means mounted adjacent to the lowest portion of said plates for preventing solid material from passing from between said plates while permitting liquid material to flow freely from between said plates.

2. Apparatus for melting solid pieces of thermoplastic material which comprises: a pair of pressure plates, heating means connected to said pressure plates for heating said plates to a temperature above the melting point of the thermoplastic material to be melted, support means connected to said plates for mounting said plates generally parallel to each other with one above the other and with said plates inclined to a horizontal plane by an angle exceeding 10°, the lower one of said plates having lowermost and uppermost portions and side edges extending therebetween, said support means including reciprocable power means for forcing said plates together, stop means mounted adjacent to said lowermost portion of said lower plate for preventing solid material from passing from between said plates while permitting free flow of liquid from between said plates, and spacer means mounted adjacent to the upper surface of said lower plate and extending in two rows between said lowermost and uppermost portions of said lower plate and defining between said two rows a central portion of lower plate and defining side portions of said lower plate between each row and one of said side edges of said lower plate, said spacer means providing lateral support for retaining solid pieces of material on said central portion of said plate and being provided with passageways for permitting liquid flow between said central and side portions of said plate.

3. Apparatus for melting thermoplastic materials which comprises a support frame, a generally rectangular lower plate mounted on said frame inclined to a horizontal plane by an angle between 10° and 80° with said lower plate having generally horizontal lower and upper edges and inclined side edges, said frame being open adjacent to said lower and upper edges and having upwardly extending side walls extending from said side edges, a plurality of spaced apart stop rods attached to said plate adjacent to said lower edge and extending generally upwardly from said plate, a second plurality of spaced apart rods mounted on said plate and extending generally upwardly therefrom with said second plurality divided into two parallel groups extending from said lower edge to said upper edge inwardly from said side edges, an operating arm movably mounted on said frame and adapted to be forced toward the upper surface of said plate, an upper plate mounted on said operating arm above and generally parallel to said lower plate and having a periphery positioned within said rods, and electrical heating means connected to both of said plates for heating said plates to a temperature above the melting point of a thermoplastic material to be melted.

References Cited in the file of this patent
UNITED STATES PATENTS

| | | |
|---|---|---|
| 993,400 | Peterson | May 30, 1911 |
| 2,207,426 | Bailey | July 9, 1940 |
| 2,439,367 | Middlestadt | Apr. 6, 1948 |
| 2,472,594 | Kuehn et al. | June 7, 1949 |
| 2,648,264 | Green | Aug. 11, 1953 |
| 2,773,496 | Czarnecki | Dec. 11, 1956 |

FOREIGN PATENTS

| | | |
|---|---|---|
| 50,237 | Sweden | Oct. 26, 1921 |